(12) United States Patent
Kim

(10) Patent No.: US 12,129,955 B2  
(45) Date of Patent: Oct. 29, 2024

(54) AMORPHOUS INNER-COATED PIPE AND METHOD FOR PRODUCING SAME

(71) Applicant: ATTOMETAL TECH PTE. LTD., Singapore (SG)

(72) Inventor: Choongnyun Paul Kim, Seoul (KR)

(73) Assignee: ATOMETAL TECH PTE. LTD., Singapore (SG)

(*) Notice: Subject to any disclaimer, the term of this patent is extended or adjusted under 35 U.S.C. 154(b) by 737 days.

(21) Appl. No.: 17/257,598

(22) PCT Filed: Aug. 14, 2019

(86) PCT No.: PCT/KR2019/010390  
§ 371 (c)(1),  
(2) Date: Apr. 7, 2022

(87) PCT Pub. No.: WO2020/036447  
PCT Pub. Date: Feb. 20, 2020

(65) Prior Publication Data  
US 2022/0299153 A1    Sep. 22, 2022

(30) Foreign Application Priority Data  
Aug. 14, 2018 (SG) .............................. 1020186896U

(51) Int. Cl.  
F16L 58/08    (2006.01)  
B21C 37/09    (2006.01)

(52) U.S. Cl.  
CPC .............. F16L 58/08 (2013.01); B21C 37/09 (2013.01)

(58) Field of Classification Search  
CPC ........................................ F16L 58/08  
USPC ................................ 138/145, 146, 137, 141  
See application file for complete search history.

(56) References Cited

U.S. PATENT DOCUMENTS

| | | | |
|---|---|---|---|
| 3,102,187 A | 8/1963 | Coscia | |
| 4,132,343 A | 1/1979 | Kullendorff | |
| 6,391,276 B1 * | 5/2002 | Suda .................. | B01D 53/9422 423/598 |

(Continued)

FOREIGN PATENT DOCUMENTS

| CN | 1948544 A | 4/2007 |
|---|---|---|
| CN | 103302287 A | 9/2013 |

(Continued)

OTHER PUBLICATIONS

JP Office Action Feb. 8, 2022.  
CN Office Action dated Nov. 2, 2022.  
EP search report dated Sep. 24, 2021.

*Primary Examiner* — Patrick F Brinson  
(74) *Attorney, Agent, or Firm* — Harvest IP Law, LLP

(57) ABSTRACT

Disclosed is a coated pipe having an amorphous inner surface and a method of manufacturing the same, whereby an amorphous alloy powder is coated on an inner surface of the pipe, thus ensuring that an amorphous structure is maintained after coating and thus coating density, corrosion resistance, and wear resistance of the pipe are improved. The coated pipe having an amorphous inner surface includes: a pipe; and a coating layer provided on an inner surface of the pipe, wherein the coating layer is an alloy or metal layer of a material different from a material of the pipe and contains an amorphous phase in a proportion of equal to or greater than 90%.

15 Claims, 14 Drawing Sheets

(56) References Cited

U.S. PATENT DOCUMENTS

| | | |
|---|---|---|
| 2008/0248222 A1 | 10/2008 | Ohara |
| 2010/0207116 A1* | 8/2010 | Mattmann ............. C30B 29/403 257/E29.094 |
| 2010/0266781 A1 | 10/2010 | Kusinski et al. |
| 2012/0202045 A1 | 8/2012 | Mutsuda et al. |
| 2017/0306182 A1 | 10/2017 | Miller |
| 2021/0291023 A1* | 9/2021 | Kim .......................... C23C 4/06 |

FOREIGN PATENT DOCUMENTS

| | | |
|---|---|---|
| CN | 104180081 A | 12/2014 |
| CN | 106460129 A | 2/2017 |
| CN | 106756642 A | 5/2017 |
| CN | 107794484 A | 3/2018 |
| CN | 107830309 A | 3/2018 |
| JP | 61291979 A | 12/1986 |
| JP | 6277464 A | 4/1987 |
| JP | 6299452 A | 5/1987 |
| JP | 01212759 A | 8/1989 |
| JP | 09241832 A | 9/1997 |
| JP | 2000239860 A | 9/2000 |
| JP | 2003013968 A | 1/2003 |
| JP | 2004106016 A | 4/2004 |
| JP | 2007131952 A | 5/2007 |
| JP | 2008-508487 T | 3/2008 |
| JP | 2009155729 A | 7/2009 |
| KR | 20050119616 A | 12/2005 |
| KR | 20120027284 A | 3/2012 |
| KR | 20160036524 A | 4/2016 |
| KR | 20160039594 A | 4/2016 |
| KR | 20160107486 A | 9/2016 |
| WO | 2015168481 A1 | 11/2015 |
| WO | 2016140544 A1 | 9/2016 |
| WO | 2017061770 A1 | 4/2017 |

\* cited by examiner

Fig. 2
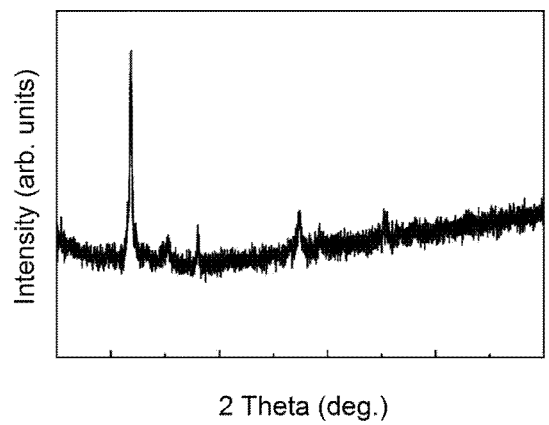
(a)
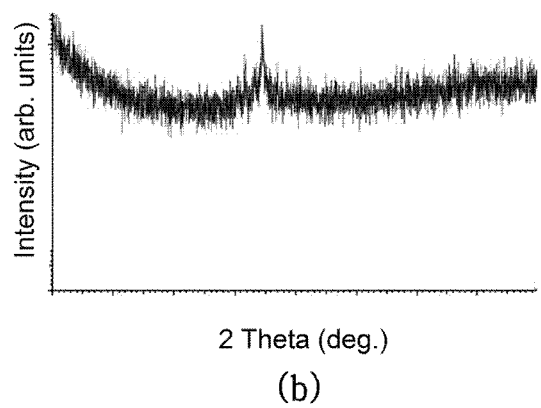
(b)
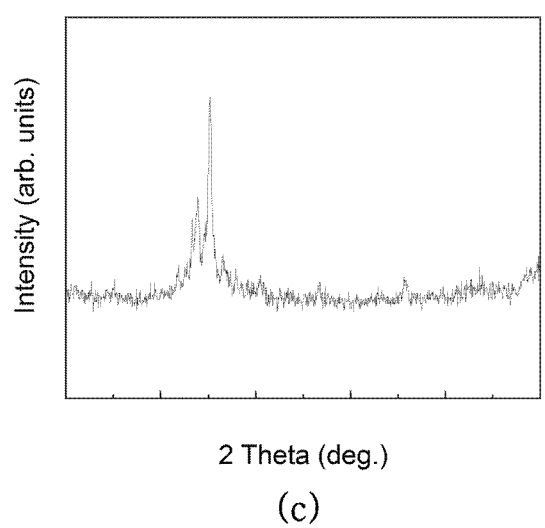
(c)

Fig. 3
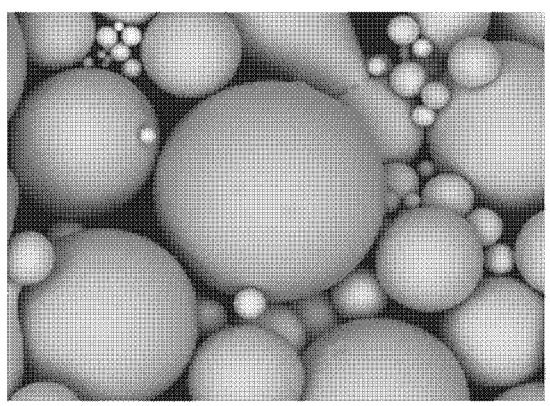
(a)
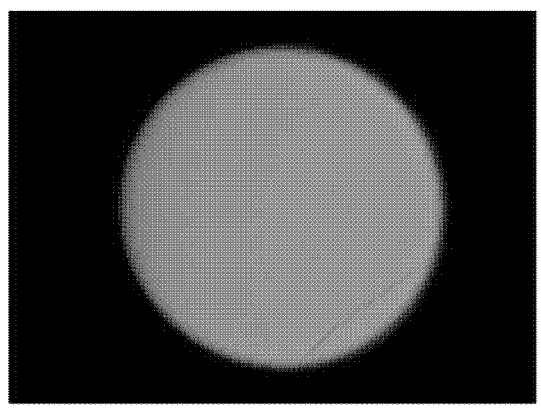
(b)
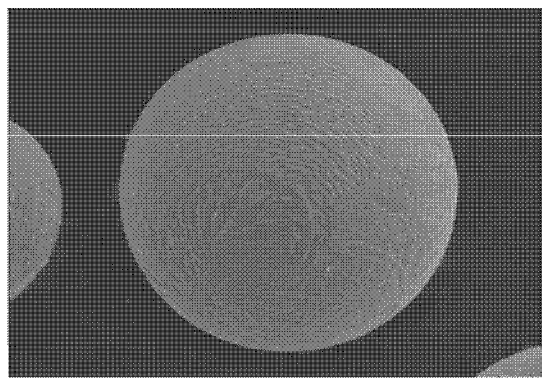
(c)
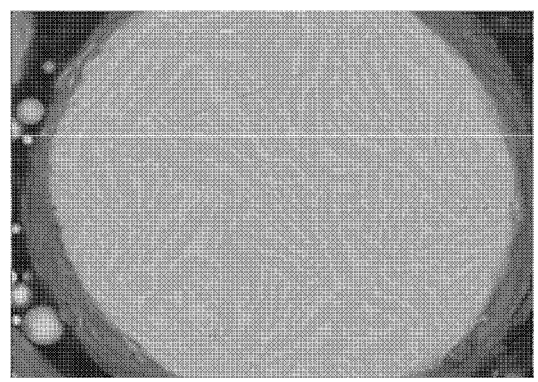
(d)

Fig. 5
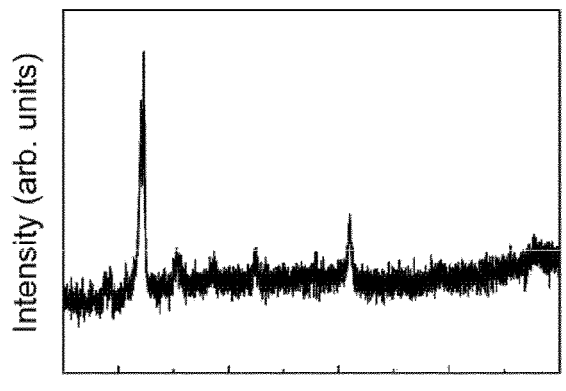
(a)
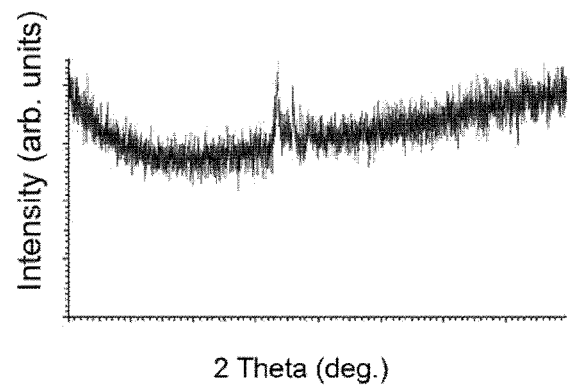
(b)
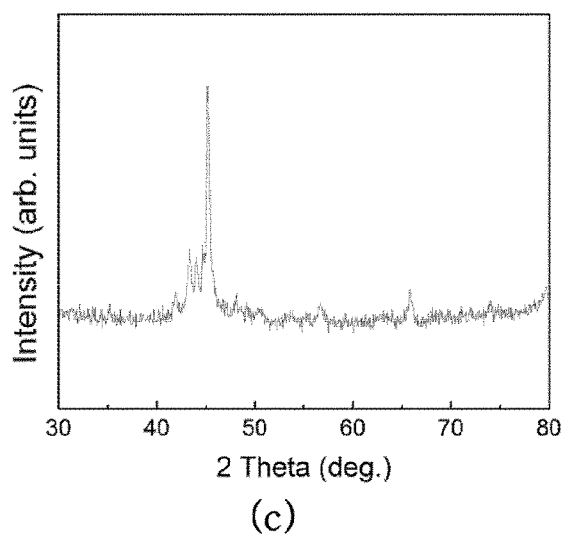
(c)

Fig. 6
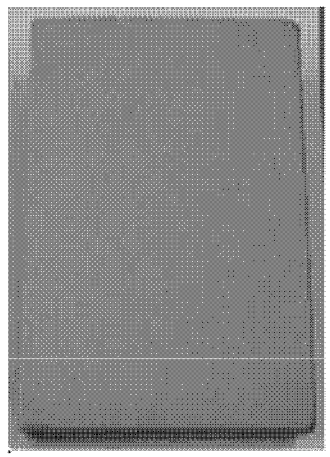
(a)
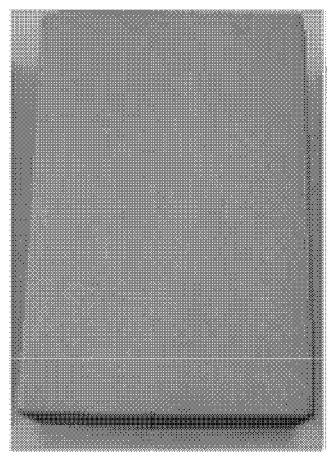
(b)
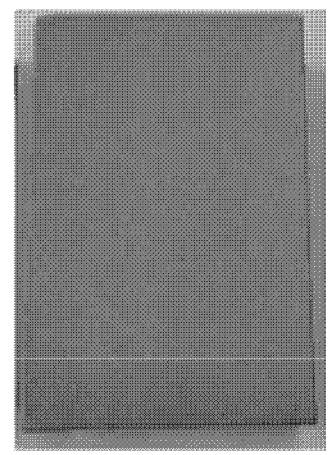
(c)
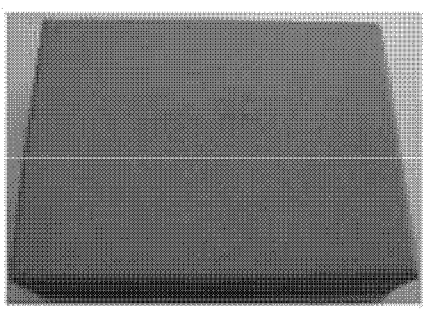
(d)
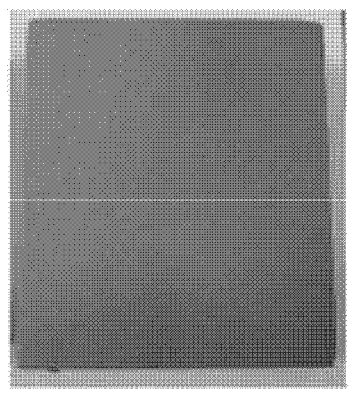
(e)
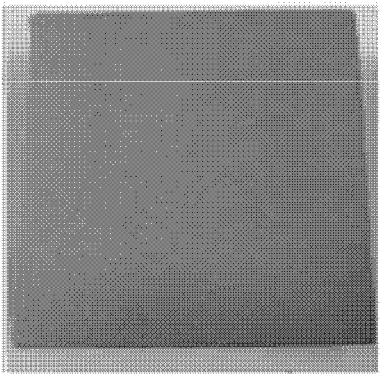
(f)
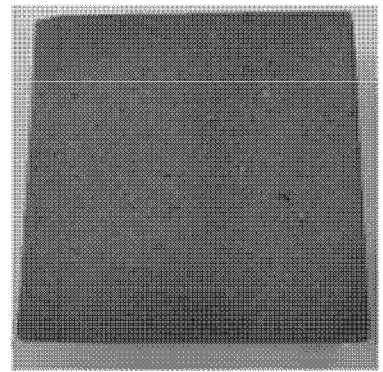
(g)

Fig. 7
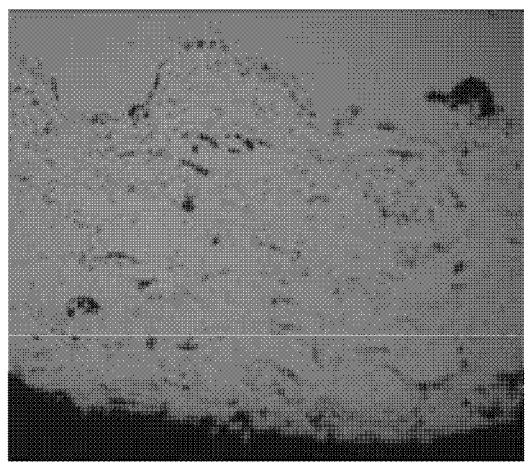
(a)
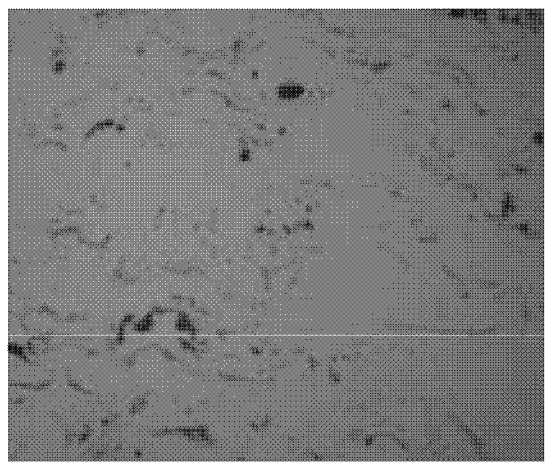
(b)
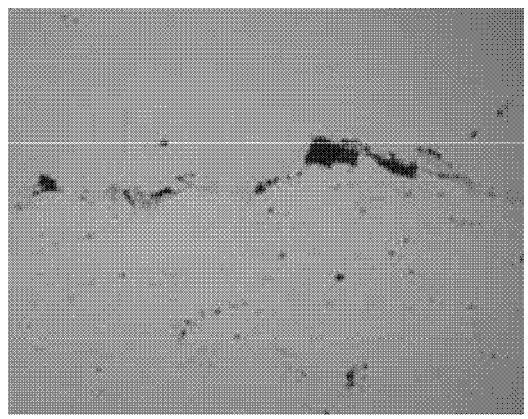
(c)
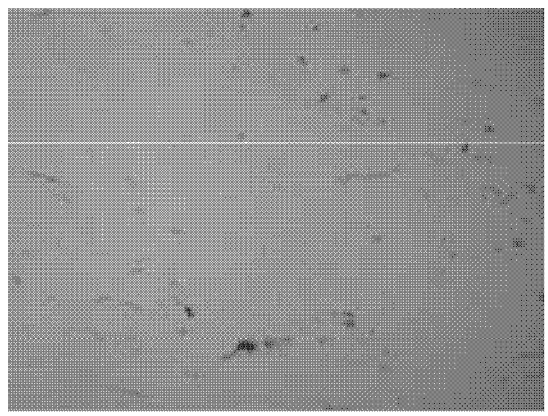
(d)

Fig. 8
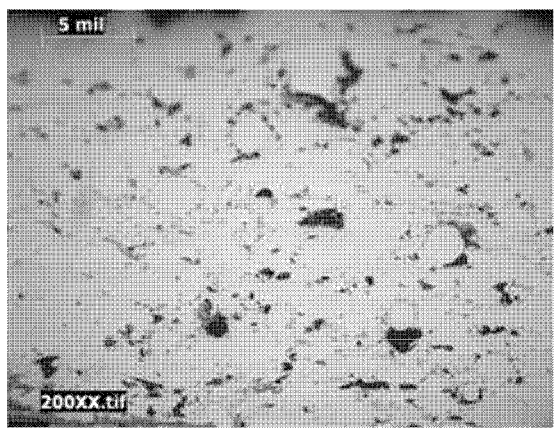
(a)
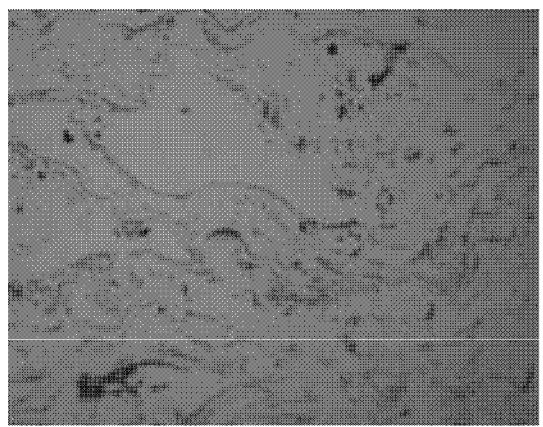
(b)
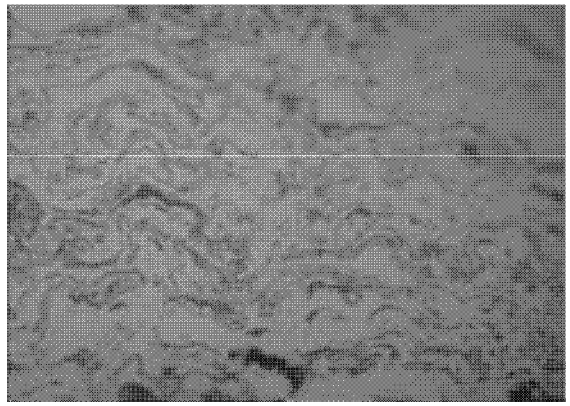
(c)

cross-section

Fig. 10  cross-section cross-section

Fig. 12
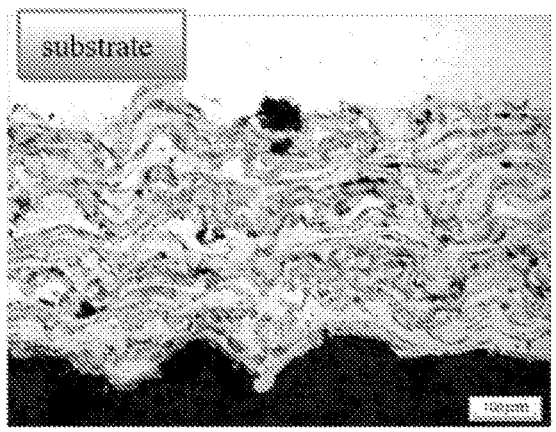 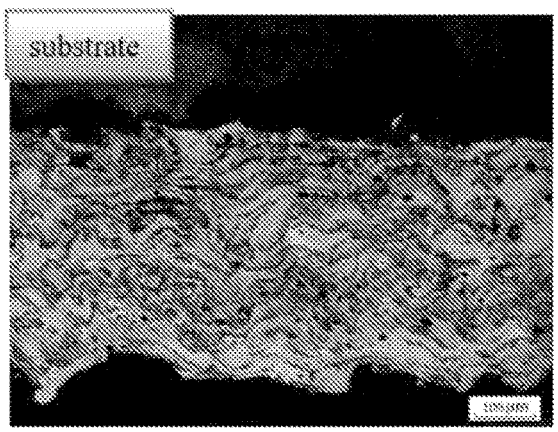
(a) (b)

AMORPHOUS INNER-COATED PIPE AND METHOD FOR PRODUCING SAME

CROSS REFERENCE TO RELATED APPLICATIONS

This application is a National Stage of International Application No. PCT/KR2019/010390 filed Aug. 14, 2019, claiming priority based on Singapore Patent Application No. 10-2018-06896U filed Aug. 14, 2018.

BACKGROUND OF THE INVENTION

Field of the Invention

The present invention relates generally to a coated pipe having an amorphous inner surface. More particularly, the present invention relates to a coated pipe having an amorphous inner surface and a method of manufacturing the same, whereby an amorphous alloy powder is coated on an inner surface of the pipe, thus ensuring that an amorphous structure is maintained after coating and thus coating density, corrosion resistance, and wear resistance of the pipe are improved.

Description of the Related Art

Iron and steel are very fundamental materials widely used in heavy and chemical industries. Of these, the steel industry is known to have a high forward linkage effect (refers to economic effect that the industrial development causes the change of the related industries). Such steel is mainly manufactured in the form of plates, rods, and pipes. Of these, pipes play a pivotal role in various industrial fields such as chemicals, oil refining, power plants, and the like. Particularly in industrial field such as chemicals, environment, or the like, there is an increasing demand for pipes having excellent corrosion resistance and wear resistance.

In order to address such a demand, attempts have been made to coat various organic and inorganic materials on the inner surface of a pipe. This approach is applied to a pipe that is manufactured in such a manner that a plate (base metal) is folded and welded in various forms such as spirals, and the like, and then the organic and inorganic materials are coated on the inner surface of the pipe by thermal spraying or the like.

However, in the case of such a pipe manufacturing method in the related art, there is an inconvenience in performing coating itself, and further due to the limitation of thermal spraying equipment, the smaller the inner diameter of the pipe, the more difficult the pipe is to coat. This is particularly the case where a pipe has an inner diameter less than 3 inches or the ratio between the inner diameter and the length is equal to or greater than 1:2. Therefore, despite high demand for pipes having excellent corrosion resistance and wear resistance, such a method in the related art is still difficult to apply to a pipe having a small inner diameter.

The foregoing is intended merely to aid in the understanding of the background of the present invention, and is not intended to mean that the present invention falls within the purview of the related art that is already known to those skilled in the art.

DOCUMENTS OF RELATED ART (Patent document 1) U.S. Pat. No. 3,102,187

SUMMARY OF THE INVENTION

Accordingly, the present invention has been made keeping in mind the above problems occurring in the related art, and an objective of the present invention is to provide a coated pipe having an amorphous inner surface capable of maintaining an amorphous structure even after coating, thus improving coating density, corrosion resistance, and abrasion resistance of the pipe.

Another objective of the present invention is to provide a method of manufacturing a coated pipe having an amorphous inner surface, whereby an amorphous alloy powder is efficiently coated on an inner surface of a pipe having a small inner diameter.

In order to achieve the above objectives, according to one aspect of the present invention, there is provided a pipe, including: a pipe; and a coating layer provided on an inner surface of the pipe, wherein the coating layer is an alloy or metal layer of a material different from a material of the pipe and contains an amorphous phase in a proportion of equal to or greater than 90%.

According to another aspect of the present invention, there is provided a method of manufacturing a pipe, the method including: forming a thermal sprayed coating layer on a surface of a plate using an Fe-based amorphous alloy; forming the amorphous coated plate into a pipe shape such that a coating surface becomes an inner surface; and seaming opposite ends of the plate such that the plate maintains the pipe shape.

According to the coated pipe having an amorphous inner surface according to the embodiments of the present invention, there is an advantage in that the amorphous structure can be maintained even after coating, thus realizing improved coating density, corrosion resistance, and wear resistance of the pipe. The Fe-based amorphous alloy coating layer formed herein can maintain a high amorphous phase proportion.

Furthermore, according to the method of manufacturing the coated pipe having an amorphous inner surface according to the embodiments of the present invention, there is an advantage in that the amorphous alloy powder can be efficiently coated on the inner surface of the pipe having a small inner diameter. Furthermore, the coated pipe having an amorphous inner surface according to the present invention has an advantage of being easy to manufacture and thus being excellent in productivity.

BRIEF DESCRIPTION OF THE DRAWINGS

The above and other objectives, features and other advantages of the present invention will be more clearly understood from the following detailed description when taken in conjunction with the accompanying drawings, in which:

FIG. 1 shows XRD graphs of Fe-based amorphous alloy powders according to the present invention, in which FIGS. 1a to 1e are XRD graphs of Fe-based amorphous alloy powders of Examples 1, 3, 6, 7, and 8, respectively;

FIG. 2 shows XRD graphs of Fe-based alloy powders according to Comparative Examples, in which FIGS. 2a to 2c are XRD graphs of Fe-based alloy powders of Comparative Examples 1, 5, and 7, respectively;

FIG. 3 shows SEM images, in which FIGS. 3a and 3b are SEM images of an Fe-based amorphous alloy powder of Example 7 and a cross-section thereof, respectively, and FIGS. 3c and 3d are SEM images of an Fe-based alloy powder of Comparative Example 7 and a cross-section thereof, respectively;

FIG. 4 shows XRD graphs of coating samples according to the present invention, in which FIGS. 4a to 4e are XRD graphs of coating samples of Examples 9, 11, 14, 15, and 16 to which Fe-based amorphous alloy powders of Examples 1, 3, 6, 7, and 8 are applied, respectively;

FIG. 5 shows XRD graphs of coating samples of Comparative Examples, in which FIGS. 5a to 5c are XRD graphs of coating samples of Comparative Examples 8, 12, and 14 to which Fe-based alloy powders of Comparative Examples 1, 5, and 7 are applied, respectively;

FIG. 6 shows surface images of thermal sprayed coatings using Fe-based amorphous alloy powders according to the present invention and thermal sprayed coatings using alloy powders of Comparative Examples, in which FIGS. 6a to 6c are surface images of thermal sprayed coatings using Fe-based amorphous alloy powders of Examples 1, 7, and 8, respectively, and FIGS. 6d to 6g are surface images of thermal sprayed coatings using alloy powders of Comparative Examples 1, 3, 5, and 7, respectively;

FIG. 7 shows images (200× magnification) of cross-sections of thermal sprayed coating samples using Fe-based amorphous alloy powders of Examples 1, 3, 6, and 8 according to the present invention, which are observed with an optical microscope, in which FIGS. 7a to 7d are images of cross-sections of samples of Examples 9, 11, 14, and 16, respectively;

FIG. 8 shows images (200× magnification) of cross-sections of thermal sprayed coating samples using alloy powders of Comparative Examples 1, 4, and 7, which are observed with the optical microscope, in which FIGS. 8a to 8c are images of cross-sections of samples of Comparative Examples 8, 11, and 14, respectively;

FIG. 12 shows images observed with the optical microscope, in which FIGS. 12a and 12b are images of an uncorroded cross-section and a corroded cross-section of a sample of an inner surface of a typical pipe;

DETAILED DESCRIPTION OF THE INVENTION

Figure 1:
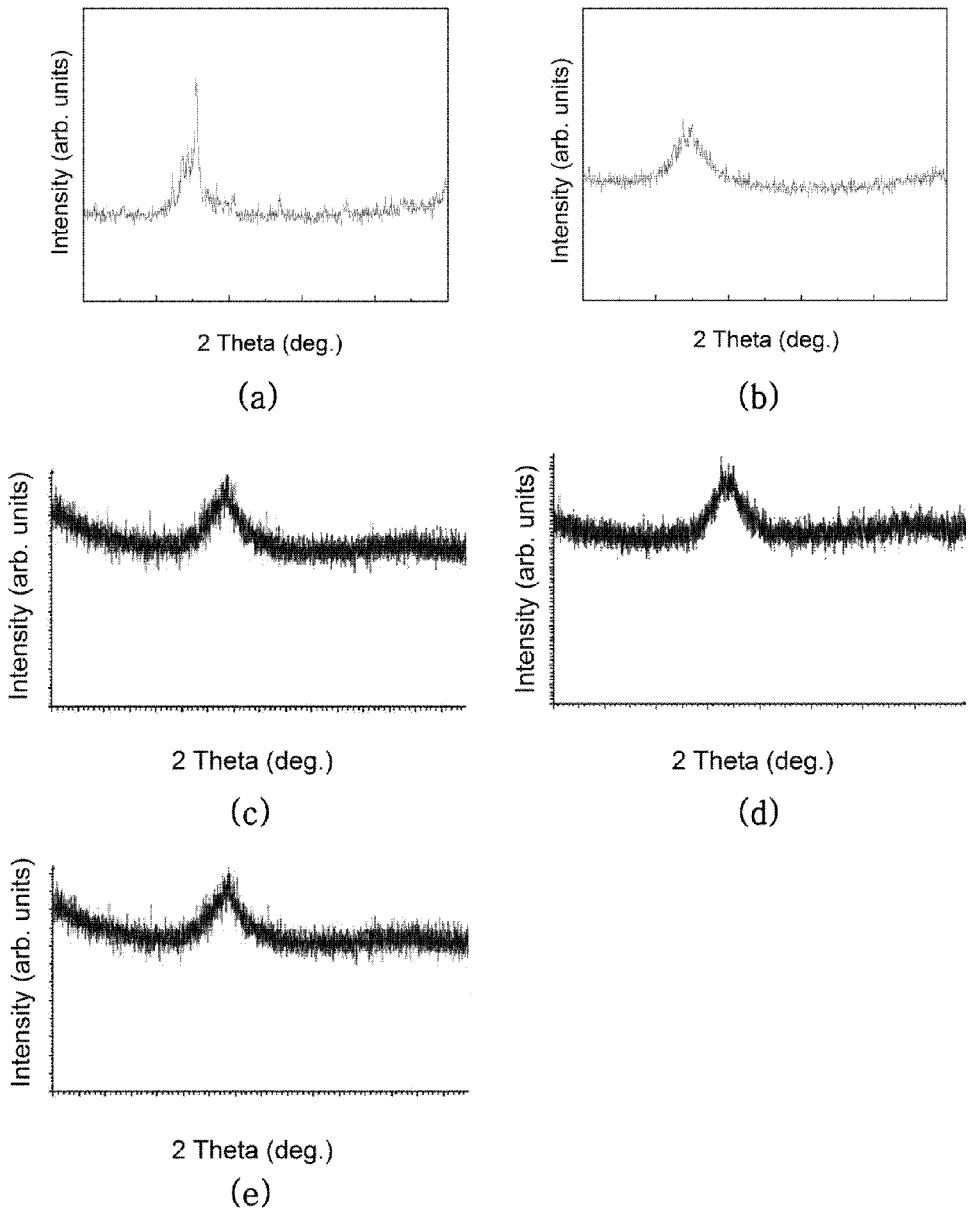

Hereinbelow, exemplary embodiments of the present invention will be described in detail with reference to the accompanying drawings. Throughout the drawings, the same reference numerals will refer to the same or like parts.

Hereinafter, the present invention will be described in detail.

In the present specification, "amorphous" refers to a phase (also used as non-crystalline or amorphous phase) which lacks the long-range order of a crystal, e.g., which does not have a crystalline structure.

Furthermore, in the present specification, "coating layer" includes a coating film and the like made using an Fe-based amorphous alloy powder, and this is mainly made by thermal spraying.

Furthermore, in the present specification, "Fe-based amorphous alloy powder" refers an alloy powder in which iron is contained at the highest weight ratio, and an amorphous phase is not simply contained in the powder, but substantially occupies most of the powder, for example, the amorphous phase is contained in a proportion of equal to or greater than 90%.

As stated above, steel-based pipes play a pivotal role in various industries such as chemicals, oil refining, power plants, and the like. Particularly in the industrial field such as chemicals, environment, or the like, the corrosion resistance and wear resistance of pipes are more difficult to ensure. In order to address this, attempts have been made to coat various organic and inorganic materials on the inner surface of a pipe. In addition to such attempts, efforts have recently been made to secure rigidity of various members by coating using alloy powder. Such an alloy powder is usually composed of carbon (C), chromium (Cr), iron (Fe), and the like as main components, and a composition thereof is determined to fulfill physical properties such as density, corrosion resistance, abrasion resistance, and the like. Various methods are well known in the art for making alloy powders.

In view of this problem, the present applicant has invented an alloy powder having a specific composition that is a raw material of the Fe-based amorphous alloy layer, whereby a coating layer has an amorphous structure even by thermal spraying such as high velocity oxygen fuel (HVOF) spraying, plasma spraying, flame spraying, twin wire arc spraying (TWAS), and the like, thereby improving physical properties such as coating density, corrosion resistance, abrasion resistance, and the like which are advantageous over a pipe in the relate art. The present applicant has applied this technique to the inner surface of a pipe.

Such a coated pipe having an amorphous inner surface according to embodiments of the present invention may be a pipe that is made by coating an Fe-based amorphous alloy according to an embodiment of the present invention on the inner surface thereof.

The coated pipe having an amorphous inner surface according to the embodiments of the present invention includes a pipe and an Fe-based amorphous alloy layer coated on the inner surface of the pipe.

Herein, the pipe is made by forming a plate into a tubular form, and examples of materials thereof may include metal such as cast iron, carbon steel, stainless steel, maraging steel, aluminum, brass, and copper, carbon fiber reinforced plastic and a material having similar properties, and a mixture thereof. However, the present invention is not limited thereto.

The shape of the pipe may be formed in a circular, square, oval shape without being limited thereto, and any shape that can be formed by forming a plate is possible.

In the following embodiments of the present invention, the diameter of the pipe is also not limited. In order to form a coating layer on the inner surface of a pipe in the related art, a pipe having an inner diameter of equal to or greater than 3 inches is required. However, in the present embodiment, due to the fact that forming is performed after the coating layer is formed on the plate, coating is applicable to small diameter pipes, and also cases where the ratio between the inner diameter and the length is equal to or greater than 1:2.

A thickness t1 of the plate used for a pipe may vary depending on uses, but is usually 1 mm to 20 mm. Herein, as will be described later, an alloy powder coating layer is formed on the plate, and in this case, when the thickness of the alloy powder coating layer is t2, it is preferable that t2 fulfills the following equation.

$$t1*0.05 \leq t2 \leq t1*0.3$$

For example, when the thickness of the plate used for a pipe is 3 mm, the thickness of the coating layer may be 0.3 mm.

Herein, the above-described alloy powder coating layer on the inner surface of the pipe is coated using an Fe-based amorphous alloy. The Fe-based amorphous alloy layer used in the present invention includes an amorphous structure and is characterized by maintaining the amorphous structure even after coating.

Hereinafter, the characteristics and the like of each component constituting the alloy powder will be described in detail. Meanwhile, in the present specification, "amorphous" refers to an amorphous phase which has a uniform composition, but in which the atoms are arranged randomly and thus crystalline lattice is not observed due to lack of long-range order. The Fe-based amorphous alloy layer may refer to an alloy layer in which iron, chromium, and molybdenum are contained as main components and an amorphous structure is not simply contained in the alloy powder, but substantially occupies most of the alloy powder, for example, the amorphous structure is contained in a proportion of equal to or greater than 90%.

The Fe-based amorphous alloy is made of an Fe-based amorphous alloy powder containing iron, chromium and molybdenum, and further containing at least one selected from carbon and boron.

The Fe-based amorphous alloy powder is, for example, a powder having a high amorphous phase proportion, such as when an amorphous phase is contained in a proportion of equal to or greater than 90%, equal to or greater than 95%, equal to or greater than 99%, equal to or greater than 99.9%, or substantially 100% when prepared by an atomizing method. That is, an Fe-based amorphous alloy powder having the high amorphous phase proportion as described above is prepared according to the cooling rate.

Meanwhile, the Fe-based amorphous alloy powder as a raw material of the Fe-based amorphous alloy is prepared using a gas atomizer. In detail, the Fe-based amorphous alloy powder is prepared by spray cooling in a molten state in atomizer under the atmosphere of inert gas such as helium, nitrogen, neon, argon or the like. When prepared in this way, it is possible that a powder having a high purity amorphous phase is prepared, which is a special alloy powder in the amorphous state that differs in atomic structure from an alloy powder in the related art.

The Fe-based amorphous alloy powder may be prepared in a variety of shapes and diameters without being limited thereto, and includes a first component, a second component, a third component, and a fourth component for making the Fe-based amorphous alloy described above.

The first component is iron (Fe), which is a component used to improve the rigidity of an alloy powder coating, and the second component is chromium (Cr), which is used to improve the physical properties of the alloy powder coating, such as wear resistance, corrosion resistance, and the like. The second component may be contained in an amount of equal to or less than 55.3 parts by weight per 100 parts by weight of the first component, preferably 25.4 parts by weight to 55.3 parts by weight.

The third component is molybdenum (Mo) used to impart wear resistance and corrosion resistance, as well as coating density and friction resistance. The third component may be contained in an amount of equal to or less than 84.2 parts by weight per 100 parts by weight of the first component, preferably 35.6 parts by weight to 84.2 parts by weight.

The fourth component uses at least one or two of carbon (C) and boron (B), and the fourth component is used to improve amorphous forming ability by atomic size mismatch with the other components, packing ratio efficiency, or the like. It is preferable that the fourth component is contained in an amount of equal to or less than 23.7 parts by weight, 1.7 parts by weight to 23.7 parts by weight, 3.4 parts by weight to 23.7 parts by weight, or 3.4 parts by weight to 15 parts by weight, per 100 parts by weight of the first component.

In addition to the above-described components, the Fe-based amorphous alloy powder may intentionally or unintentionally contain additional components selected from the group consisting of tungsten, cobalt, yttrium, manganese, silicon, aluminum, niobium, zirconium, phosphorus, nickel, scandium, and a mixture thereof. Particularly, yttrium (Y) acts as a flux for yttrium oxide formation to improve amorphous forming ability. In terms of amount of the additional components, the additional components are contained in a total amount of less than 1.125 parts by weight, equal to or less than 1.000 parts by weight, or equal to or less than 0.083 parts by weight, per 100 parts by weight of Iron. That is, when the amounts of the first component, the second component, the third component, the fourth component, and the additional component fulfill the above-described weight proportions, this case is regarded as an Fe-based alloy powder according to the embodiment of the present invention.

Furthermore, each of the additional components is contained in an amount of equal to or less than 0.9 parts by weight, preferably equal to or less than 0.05 parts by weight. This is because when the amount of the additional component is outside such a range, the amorphous forming ability is significantly reduced. The Fe-based amorphous alloy powder exhibits excellent properties such as coating density, strength, abrasion resistance, friction resistance, corrosion resistance, and the like due to the high amorphous phase proportion thereof.

The Fe-based amorphous alloy powder may have an average particle size in a range of 1 to 150μ, but is not limited thereto. The powder size thereof may be controlled through sieving depending on uses.

For example, when thermal spraying is to be performed, a target Fe-based amorphous alloy powder may be used after controlling the powder size in a range of 16 to 54μ through sieving.

When three-dimensional (3D) printing is to be performed, the powder size of the target Fe-based amorphous alloy powder may also be controlled depending on 3D printing methods. For example, when 3D printing is to be performed by a powder bed fusion method, the powder size may be controlled to be equal to or less than 20μ, and when 3D printing is to be performed by a direct energy deposit method, the powder size may be controlled to be in a range of 54 to 150μ.

The thickness of the Fe-based amorphous alloy coated on the inner surface of the pipe is 0.05 to 0.3 mm, preferably 0.1 to 0.3 mm or 0.05 to 0.2 mm, and more preferably 0.075 to 0.125 mm. Herein, when the thickness of the Fe-based amorphous alloy is outside such a range, mechanical requirements related to coating density, corrosion resistance, or abrasion resistance of the a coated pipe having an amorphous inner surface according to the present invention may not be fulfilled. Meanwhile, the Fe-based amorphous alloy may be coated on the entire inner surface of the pipe, or may be coated only on a portion of the inner surface of the pipe that requires strength reinforcement, such as a bent or folded portion. However, the area of the Fe-based amorphous alloy coated on the inner surface of the pipe may be equal to or greater than 60% of the total area, preferably 70 to 95%, and more preferably 75 to 100%. With such a range, it is possible that corrosion protection and life extension of the pipe are provided.

Furthermore, the Fe-based amorphous alloy may be formed in various patterns such as a lattice pattern and the like as necessary.

The Fe-based amorphous alloy powder is characterized by maintaining the above-described proportion of the amorphous phase even when re-melted or when exposed to high temperature and re-cooled for solidification. Herein, proportion a of the amorphous phase in the Fe-based amorphous alloy powder prepared by an atomizing method and proportion b of an alloy made by melting the Fe-based amorphous alloy powder above the melting point of the alloy and then re-cooling the same fulfills the following equation.

$$0.9 \leq b/a \leq 1 \quad \text{[Equation 1]}$$

Here, examples of a method of making an alloy by melting the Fe-based amorphous alloy powder above the melting point of the alloy and then re-cooling the same in order to derive the b may include thermal spraying, 3D printing, and a known casting method such as metallurgy.

In addition, the ratio of b/a of the Equation 1 may be preferably 0.95 to 1, more preferably 0.98 to 1, and more preferably 0.99 to 1.

Furthermore, the Fe-based amorphous alloy powder may also be made as a soft magnetic powder due to excellent electrical and magnetic properties thereof.

The Fe-based amorphous alloy powder may be applied to a general coating process of thermal spraying such as HVOF spraying, plasma spraying, arc wire spraying, and the like to prepare a coating layer. In this case, the coating layer has an amorphous structure and is applied to the inner surface of the pipe, resulting in physical properties such as strength, corrosion resistance, abrasion resistance, friction resistance, and the like being greatly improved.

For example, the Fe-based amorphous alloy powder is applied to a thermal spraying process to form a coating layer or a coating film on an object.

Thermal spraying is a technique whereby a metal or metal compound is melted into fine droplets and sprayed onto a surface of an object to come into close contact with the surface. Examples of thermal spraying include HVOF spraying, plasma spraying, laser cladding, general flame spraying, diffusion, cold spraying, vacuum plasma spraying (VPS), low-pressure plasma spraying (LPPS), TWAS, and the like.

Thermal spraying involves a process of melting an Fe-based amorphous alloy powder into droplets to form a molded product. In thermal spraying, it is problematic in that the molten amorphous alloy powder melted when exposed to high temperature is not cooled rapidly and thus is crystallized entirely or partially, resulting in the proportion of the amorphous phase being significantly lowered.

Therefore, while an amorphous metal powder in the related art has a high amorphous phase proportion, it is impossible that a molded product has excellent properties of amorphous metals.

However, the Fe-based amorphous alloy powder according to the present invention has excellent amorphous forming ability to form an amorphous phase even without securing a rapid cooling rate. This fact has an advantage in that the proportion of the amorphous phase is not lowered in the coating layer even after the process of preparing the coating layer by such surface treatment described above.

That is, when the Fe-based amorphous alloy powder, which has a high amorphous phase proportion, such as when an amorphous phase is contained in a proportion of equal to or greater than 90%, equal to or greater than 95%, equal to or greater than 99%, equal to or greater than 99.9%, or substantially 100%, is used as a thermal spraying material, a coating contains an amorphous phase in a proportion of equal to or greater than 90%, equal to or greater than 95%, equal to or greater than 99%, equal to or greater than 99.9%, or substantially 100% by volume of the total structure, thus having very excellent physical properties. Particularly, when HVOF spraying is performed using the alloy powder according to the present invention, the degree of improvement of physical properties is maximized because the proportion of the amorphous phase is substantially maintained.

Furthermore, the Fe-based amorphous alloy powder exhibits a very high coating density of 99 to 100% upon measurement, which has an advantage in suppressing penetration of corrosives through pores.

The Fe-based amorphous alloy powder has a particle size of 10 to 100 µm, preferably 15 to 55 µm. This is because when the alloy powder has a particle size of less than 10 µm, small particles may adhere to a spraying gun during a spray coating process, which may contribute to a reduction in operating efficiency. Further, this is also because when the alloy powder has a particle size of greater than 100 µm, the alloy powder may collide with a base metal without being completely dissolved (i.e., may fall to the bottom without forming a coating layer), resulting in a reduction in coating productivity and efficiency.

Particularly, in the case of an alloy made by HVOF spraying, unlike the related art, there are almost no pores present in the cross-section, and thus the alloy exhibits a full density of 99 to 100%, preferably 99.5 to 100%, and more preferably 99.8 to 100%. On the contrary, even when the pores are present, a porosity of only about 0.2 to 1.0% is exhibited.

That is, when HVOF spraying is performed, a structure in which multiple paths are stacked is formed. In detail, oxides (black color) are accumulated on each layer, and multiple layers are stacked in a wave-like shape. While this usually causes the properties of a coating to be degraded and weakened, in the present invention, the coating has no pore/oxidation film, thus ensuring that the coating exhibits ultra high density, and the performance thereof is improved. Moreover, in the present invention, it is possible that a coating containing the Fe-based amorphous alloy powder exhibits improved wear resistance, corrosion resistance, and elasticity, which are advantageous over a coating using the alloy powder in the related art.

Next, the physical properties of the Fe-based amorphous alloy layer will be described. The Vickers hardness of the Fe-based amorphous alloy layer is 700 to 1,200 Hv (0.2), preferably 800 to 1,000 Hv (0.2), and the coefficient of friction (friction resistance) is 0.001 to 0.08µ, preferably equal to or less than 0.05 at a load of 100 N, and is 0.06 to 0.12µ, and more preferably equal to or less than 0.10µ at a load of 1,000 N.

Meanwhile, the pipe applied to the present invention has a typical pipe shape, and there is no particular limitation on the length or size of the inner diameter of the pipe.

Hereinafter, a method of manufacturing a coated pipe having an amorphous inner surface according to the present invention will be described. The method of manufacturing the coated pipe having an amorphous inner surface according to the present invention includes: (a) coating an Fe-based amorphous alloy powder on a surface of a plate by thermal spraying; (b) forming the amorphous coated plate into a pipe shape such that a coating surface becomes an inner surface; and (c) seaming opposite ends of the plate such that the plate maintains the pipe shape.

In the case of a pipe manufacturing method in the related art, there is an inconvenience in performing coating itself, and further due to the limitation of thermal spraying equipment, the smaller the inner diameter of the pipe, the more difficult the pipe is to coat. This is particularly the case where a pipe has an inner diameter less than 3 inches or the ratio between the inner diameter and the length is equal to or greater than 1:2. Therefore, despite high demand for pipes having excellent corrosion resistance and wear resistance, such a method in the related art is still difficult to apply to a pipe having a small inner diameter. In view of this problem, the present applicant has invented a method of coating an Fe-based amorphous alloy powder on a plate itself, bending (or folding) the plate into a pipe shape such that a coating surface becomes an inner surface, and seaming the plate.

In order to manufacture a coated pipe having an amorphous inner surface according to the present invention, first, it is required that the Fe-based amorphous alloy powder is coated on a surface of the plate by thermal spraying (step a). It is also required that the plate is a material that is formable (i.e., bendable or foldable) into a pipe shape. In detail, examples of materials of the pipe may include those typically used as pipe raw materials, e.g., metal such as cast iron, carbon steel, stainless steel, maraging steel, aluminum, brass, and copper, carbon fiber reinforced plastic and a material having similar properties, and a mixture thereof.

The Fe-based amorphous alloy powder may contain the first to fourth components described above. In a specific example, the Fe-based amorphous alloy powder may contain chromium in an amount of 25.4 to 55.3 parts by weight and molybdenum in an amount of 35.6 to 84.2 parts by weight, per 100 parts by weight of Iron, and may further contain at least one selected from the group consisting of carbon and boron. The Fe-based amorphous alloy powder can maintain the amorphous structure even after thermal spraying is performed (a detailed description of the amorphous structure similar to that in the above description will be omitted).

Meanwhile, the Fe-based amorphous alloy powder can maintain the amorphous structure even after coating (particularly, thermal spraying) is performed (a detailed description of the amorphous structure similar to that in the above description will be omitted). Meanwhile, the Fe-based amorphous alloy powder is prepared using a gas atomizer. In detail, the Fe-based amorphous alloy powder is prepared by spray cooling in a molten state in atomizer under the atmosphere of inert gas such as helium, nitrogen, neon, argon or the like. When prepared in this way, it is possible that a powder having a complete amorphous phase (i.e., 100% amorphous phase) is prepared, which is a special alloy powder in the amorphous state that differs in atomic structure than an alloy powder in the related art. Other detailed descriptions of the Fe-based amorphous alloy powder similar to those in the above description will be omitted.

In performing coating, the thermal spraying may be any method known in the art, the conditions and the environment thereof may also be similar to those in the art. For example, a method whereby a Sulzer Metco Diamond Jet or similar equipment is used, and oxygen flow, propane flow, air flow, feeder rate, nitrogen flow, and the like are appropriately controlled may be adopted.

In detail, the thermal spraying allows the alloy layer to remain in the amorphous state even after the Fe-based amorphous alloy powder is coated, and may be performed by a method selected from the group consisting of HVOF spraying, plasma spraying, flame spraying, and TWAS. When the thermal spraying is performed, a structure in which multiple paths are stacked is formed. In detail, oxides (black color) are accumulated on each layer, and multiple layers are stacked on the plate in a wave-like shape. While this usually causes the properties of a coating to be degraded and weakened, in the present invention, the coating has little or minimal pore/oxidation film, thus ensuring that the coating exhibits ultra high density, and the physical properties such as hardness, corrosion resistance, wear resistance, and the like are improved.

Next, after coating the Fe-based amorphous alloy powder on the surface of the plate by thermal spraying, the amorphous coated plate is formed into a pipe shape such that the coating surface of the plate coated with the alloy powder becomes the inner surface (step b). That is, the present invention is to form a coating layer that can improve the corrosion resistance and wear resistance on the inner surface of the pipe, the plate is required to be bendable or foldable such that the coating sur face becomes the inner surface. Examples of the forming the plate on which the coating layer is formed may include a cylindrical-type method of forming a plate into a pipe shape by uniformly rolling the plate upon bending or folding such that the distance between the opposite ends of the plate is constant, a spiral-type method of forming a plate into a pipe shape by bending or folding the plate from a vortex or an edge adjacent to the vertex or the vertex, and the like. However, the shape is not particularly limited as long as the plate can be bent or folded to form a pipe shape.

Finally, after bending the amorphous coated plate into a pipe shape to allow the opposite ends of the plate to face each other, seaming is performed along the facing ends of the plate to form a seam, such that the plate maintains the pipe shape (step c). This is a step to prevent the bent (or rolled or folded) plate from unbending or deforming into other shapes, in which the seam is where the edges and faces of the plate meet, or where the vertices and faces meet, or where the edges, vertices, and faces meet. As such seaming, a method of allowing the plate to maintain a pipe shape, such as welding or forge welding can be used without being particularly limited thereto. Meanwhile, the pipe manufactured through the above processes does not have any particular limitation on the length or size of the inner diameter. That is, it is possible that a standardized pipe having an inner diameter of less than 3 inches having a ratio between the inner diameter and the length is equal to or less than 1:2 is manufactured.

The above-described pipe, which is manufactured by coating a corrosion-resistant/wear-resistant Fe-based amorphous alloy powder on the inner surface of the pipe by thermal spraying, and bending and seaming, is a unique invention invented by the present applicant and found nowhere else. The invention has an advantage in that the pipe with the coating is easy to manufacture to maximize productivity, and the coating layer has the amorphous structure to improve the coating density, corrosion resistance, and wear resistance of the pipe. The coated pipe having an amorphous inner surface and the method of manufacturing the same according to the present invention having the advantages as described above will be widely used in various fields that require corrosion and wear resistant pipes.

Hereinbelow, to aid to understanding the invention, exemplary embodiments of the present invention will be described in detail. It should be understood that the embodiments of the present invention may be changed to a variety of embodiments and the scope and spirit of the present invention are not limited to the embodiment described hereinbelow. The embodiments of the present invention described hereinbelow are provided for allowing those skilled in the art to more clearly comprehend the present invention.

Example 1 to Example 8

Preparation of Fe-Based Amorphous Alloy Powder

Powders containing compositions having the components and weight ratio as shown in Table 1 below were fed into an atomizer under a nitrogen gas atmosphere, and then atomized in a molten state and cooled at a cooling rate shown in Table 1 below, whereby Fe-based amorphous alloy powders of Examples 1 to 8 were prepared.

of carbon steel by thermal spraying to a thickness of 0.1 mm. Then, the coated plate was rolled into a pipe shape such that a coating surface becomes an inner surface. Finally, seaming is performed along facing ends of the rolled plate such that the plate maintains a pipe shape, whereby a coated pipe having an amorphous inner surface having a 3-inch diameter was manufactured.

Meanwhile, thermal spraying was performed using Sulzer Metco Diamond Jet equipment, under conditions of 45% oxygen flow, 48% propane flow, 52° air flow, 336% feeder rate, 15-20 RPM nitrogen flow, and 12 inch stand-off.

Comparative Example 1 to Comparative Example 7

Preparation of Fe-Based Alloy Powder

Powders containing compositions having the components and weight ratio as shown in Table 2 below were fed into an atomizer under a nitrogen gas atmosphere, and then atomized in a molten state and cooled at a cooling rate shown in Table 2 below, whereby Fe-based alloy powders of Comparative Examples 1 to 7 were prepared.

TABLE 1

| Classification | Example 1 | Example 2 | Example 3 | Example 4 | Example 5 | Example 6 | Example 7 | Example 8 |
| --- | --- | --- | --- | --- | --- | --- | --- | --- |
| Fe | 1 | 1 | 1 | 1 | 1 | 1 | 1 | 1 |
| Cr | 0.55 | 0.26 | 0.355 | 0.292 | 0.374 | 0.355 | 0.292 | 0.374 |
| Mo | 0.84 | 0.36 | 0.645 | 0.502 | 0.411 | 0.645 | 0.502 | 0.411 |
| C | 0.06 | — | 0.092 | — | .056 | 0.092 | 0.080 | 0.056 |
| B | — | 0.04 | — | 0.04 | — | 0.1 | 0.092 | 0.04 |
| Cooling rate (degree/sec) | $10^4$ | $10^4$ | $10^4$ | $10^3$ | $10^3$ | $10^2$ | $10^2$ | $10^2$ |
| Powder average diameter | 5 | 5 | 10 | 20 | 20 | 50 | 50 | 50 |

* D50 (unit: μ)

As can be seen from Table 1, the Examples according to the present invention contained the first to fourth components in a specific amount range and were cooled at a cooling rate of $10^1$ to $10^4$ (degree/sec) to prepare alloy powders having a powder average diameter of 5 to 50μ.

TABLE 2

| Classification | Comparative example 1 | Comparative example 2 | Comparative example 3 | Comparative example 4 | Comparative example 5 | Comparative example 6 | Comparative example 7 |
| --- | --- | --- | --- | --- | --- | --- | --- |
| Fe | 1 | 1 | 1 | 1 | 1 | 1 | 1 |
| Cr | 0.56 | 0.20 | 0.714 | 0.714 | 0.550 | 0.411 | 0.196 |
| Mo | 0.30 | 0.85 | 0.345 | 0.245 | 0.183 | 0.374 | 0.686 |
| C | — | — | 0.020 | 0.060 | 0.028 | 0.028 | 0.020 |
| B | — | 0.04 | — | — | 0.073 | 0.056 | 0.059 |
| Cooling rate (degree/sec) | $10^4$ | $10^4$ | $10^4$ | $10^3$ | $10^2$ | $10^2$ | $10^2$ |
| Powder average diameter | 5 | 5 | 10 | 20 | 50 | 50 | 50 |

* D50 (unit: μ)

Example 9 to Example 16

Manufacturing of Pipe Having Fe-Based Amorphous Coating

Each of the prepared Fe-based amorphous alloy powders of Examples 1 to 8 was coated on a surface of a plate made As can be seen from Table 2, the Comparative Examples according to the present invention contained the first to fourth components in a specific amount range and were cooled at a cooling rate of $10^1$ to $10^4$ (degree/sec) to prepare alloy powders having a powder average diameter of 5 to 50μ.

Comparative Example 8 to Comparative Example 14

Manufacturing of Pipe Having Coating Layer Using Fe-Based Alloy Powder

Each of the alloy powders of Comparative Examples 1 to 7 was coated on a surface of a plate by thermal spraying to a thickness of 0.1 mm in the same manner as in the Examples to manufacture a pipe having a coating layer on an inner surface.

Comparative Example 15

Coating Layer Using Ni—Cr-Based Material

Instead of the iron based amorphous alloy powder, a typical Ni—Cr-based material was coated on a plate by thermal spraying to a thickness of 0.1 mm to manufacture a typical pipe.

Test Example 1

Evaluation of Amorphousness of Alloy Powder

XRD measurement results for Fe-based amorphous alloy powders of Examples were shown in FIG. 1. FIG. 1 shows XRD graphs of Fe-based amorphous alloy powders according to the present invention, in which FIGS. 1a to 1e are XRD graphs of Fe-based amorphous alloy powders of Examples 1, 3, 6, 7, and 8, respectively. As shown in FIG. 1, it was found that each of Examples 1, 3, 6, 7, and 8 had a broad peak at a 2-Theta (2θ) value of 40 to 50 degree angles, and each of which formed an amorphous phase.

Furthermore, XRD measurement results for Fe-based amorphous alloy powders of Comparative Examples were shown in FIG. 2. FIG. 2 shows XRD graphs of Fe-based alloy powders according to Comparative Examples, in which FIGS. 2a to 2c are XRD graphs of Fe-based alloy powders of Comparative Examples 1, 5, and 7, respectively. As shown in FIG. 2, it was found that each of the Comparative Examples 1, 5 and 7 had a first sharp peak at a 2-Theta (2θ) value of 40 to 50 degree angles and an additional second peak at 65 to 70 degree angles at a minimum, and each of which formed some crystalline phase together with an amorphous phase.

Particularly, considering the height of the second peak, it was found that the number of crystalline phases increased sequentially from Comparative Example 7, Comparative Example 5, to Comparative Example 1, i.e., from FIG. 2c to FIG. 2a.

Test Example 2

Evaluation of Amorphousness of Coating

In FIG. 3, SEM images of an Fe-based amorphous alloy powder (as atomized) according to Example 7 and the cross-section thereof, and an Fe-based alloy powder (as atomized) according to Comparative Example 7 and the cross-section thereof are shown. FIGS. 3a and 3b respectively show the Fe-based amorphous alloy powder (as atomized) of Example 7 and the cross-section thereof, and FIGS. 3c and 3d respectively show the Fe-based alloy powder (as atomized) of Comparative Example 7 and the cross-section thereof.

As shown in FIG. 3b, it was found that no structure was observed, thus showing a porosity of substantially 0%. On the other hand, as shown in FIG. 3d, it was found that a number of structures were observed.

Figure 4:
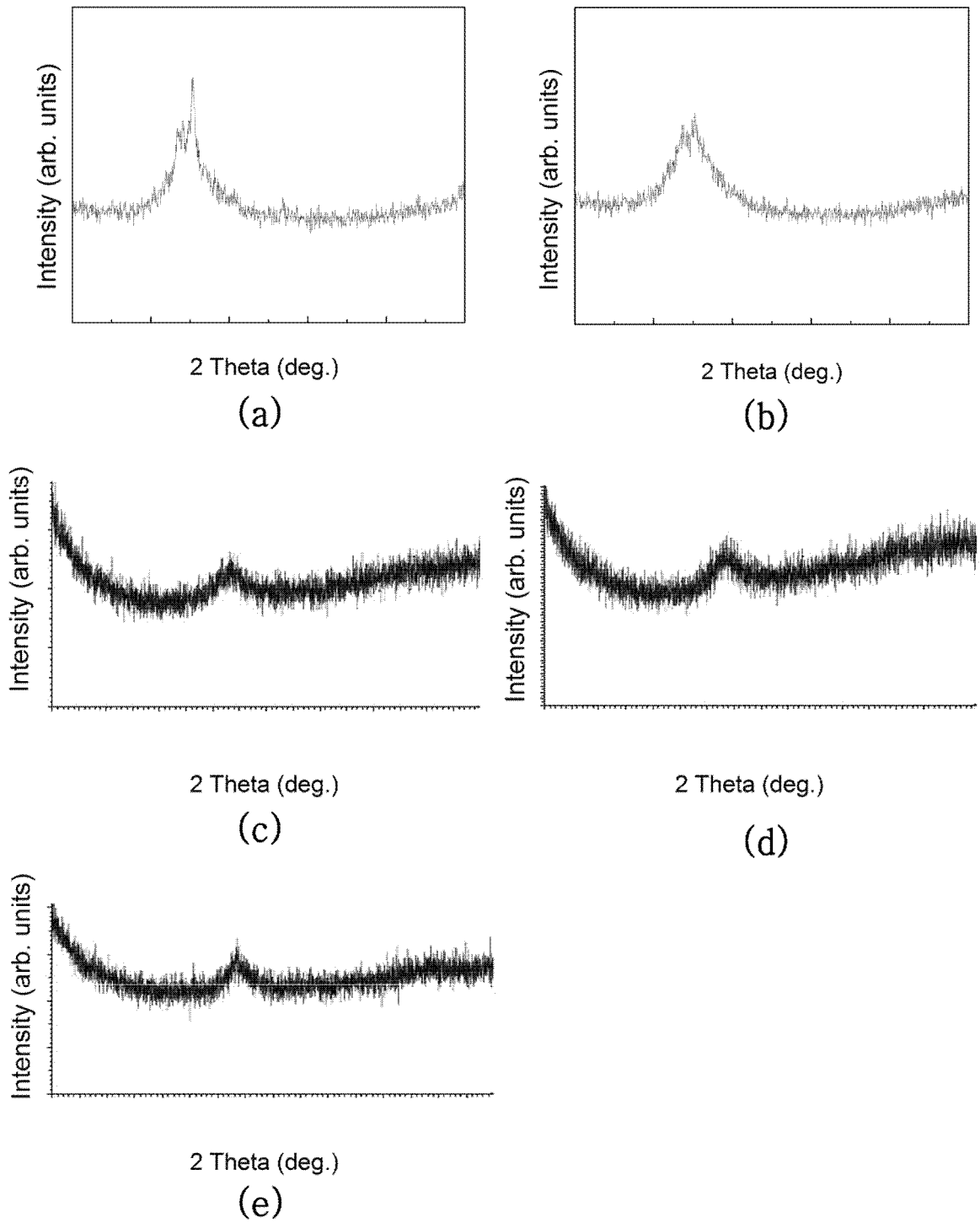

Furthermore, in FIG. 4, amorphous XRD graphs of Fe-based amorphous alloy powder coating samples prepared in Examples 9 to 16 are shown. FIG. 4 shows XRD graphs of coating samples according to the present invention, in which FIGS. 4a to 4e are XRD graphs of coating samples of Examples 9, 11, 14, 15, and 16 to which Fe-based amorphous alloy powders of Examples 1, 3, 6, 7, and 8 are applied, respectively. Referring to FIG. 4, in each of the Examples, an additional peak is not present while a wide XRD first peak is present. Therefore, it was found that powders according to the present invention had an amorphous structure.

Furthermore, in FIG. 5, XRD graphs of Fe-based alloy powder coating samples prepared in Comparative Examples are shown. FIG. 5 shows XRD graphs of coating samples of Comparative Examples, in which FIGS. 5a to 5c are XRD graphs of coating samples of Comparative Examples 8, 12, and 14 to which Fe-based alloy powders of Comparative Examples 1, 5, and 7 are applied, respectively. Referring to FIG. 5, in each of the Comparative Examples, an additional peak is present together with a sharp first peak. Therefore, it was found that powders according to the Comparative Examples are crystalline powder having no amorphous phase.

That is, it was found from such results that the alloy powders according to the present invention had a much higher amorphous forming ability than the alloy powders according to the Comparative Examples.

As a result of comparison between the XRD graphs of FIG. 1 and the XRD graphs of FIG. 3, as shown in FIG. 3, it was found that in all of the Examples, the amorphous structure of the powder was maintained even in the coating.

Particularly, in the case of the present test example, it was found that that a coating is formed to entirely have a substantially amorphous phase (equal to or greater than 95% by volume) by HVOF spraying.

Test Example 3

Macroscopic Quality Evaluation of Thermal Sprayed Coating Using Alloy Powder

FIG. 6 shows surface images of thermal sprayed coatings using Fe-based amorphous alloy powders according to the present invention and thermal sprayed coatings using alloy powders of Comparative Examples, in which FIGS. 6a to 6c are surface images of thermal sprayed coatings of Examples 9, 15, and 16 using Fe-based amorphous alloy powders of Examples 1, 7, and 8, respectively, and FIGS. 6d to 6g are surface images of thermal sprayed coatings of Comparative Examples 8, 10, 12, and 14 using Comparative Examples 1, 3, 5, and 7, respectively.

As a result of evaluation, it was found that the coating of Comparative Example 14 had poor coating surface quality (see FIG. 6g), the coatings of the remaining Examples and Comparative Examples all had excellent or good coating surface quality.

Test Example 4

Microscopic Quality Evaluation of Thermal Sprayed Coating Using Alloy Powder

FIG. 7 shows images of cross-sections of thermal sprayed coating samples using Fe-based amorphous alloy powders of Examples 1, 3, 6, and 8 according to the present invention, which are observed with an optical microscope (Leica DM4 M), in which FIGS. 7a to 7d are images of cross-sections of samples of Examples 9, 11, 14, and 16, respectively. FIG. 8 shows images of cross-sections of thermal sprayed coating samples using alloy powders of Comparative Examples 1, 4, and 7, which are observed with the optical microscope, in which FIGS. 8a to 8c are images of cross-sections of samples of Comparative Examples 8, 11, and 14, respectively. As shown in FIG. 7, it was found that the cross sections of the coating of Examples 9, 11, 14, and 16 all exhibited high density.

On the other hand, as shown in FIG. 8, it was found that the cross-sections of the coatings of Comparative Examples 8, 11, and 14 not only contained a number of unmelted particles but also contained a number of gray phases, and layer-layer characteristics were exhibited.

Test Example 5

Evaluation of Hardness of Thermal Sprayed Coating Using Alloy Powder

A micro-hardness test for cross-sections of coating samples was performed on the thermal sprayed coatings of Examples 11, 14, and 16, and on the thermal sprayed coatings of Comparative Examples 8, 10, 12, and 14 using an HVS-10 Digital Low Load Vickers Hardness Tester, and the results are shown in Table 3 below.

TABLE 3

| Classification | Area | Test value $HV_{0.2}$ | Average $HV_{0.2}$ |
|---|---|---|---|
| Example 11 | Cross-section | 802/754/828/765/710 | 771 |
| Example 14 | Cross-section | 898/834/944/848/789 | 862 |
| Example 16 | Cross-section | 1304/1139/1097/1194/1139 | 1174 |
| Comparative example 8 | Cross-section | 669/756/623/689/683 | 684 |
| Comparative example 10 | Cross-section | 928/862/876/921/802 | 877 |
| Comparative example 12 | Cross-section | 828/848/1012/944/771 | 880 |
| Comparative example 14 | Cross-section | 821/855/808/783/633 | 780 |

As shown in Table 3, in terms of the cross-section, a sample to which the alloy powder of Example 16 was applied was the most excellent in average hardness, and those of the remaining Examples had similar hardness values to the Comparative Examples.

Test Example 6

Evaluation of Corrosion Resistance of Amorphous Alloy Layer in Pipe

Figure 9:
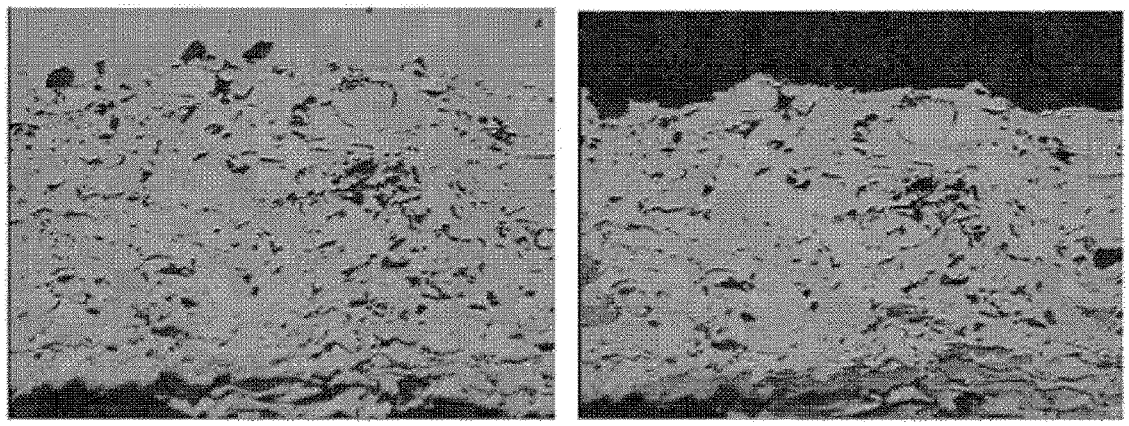
FIGS. 9 to 11 are images of uncorroded/corroded cross-sections of an amorphous alloy layer in a pipe according to the present invention, which are observed with the optical microscope.
Figure 10:
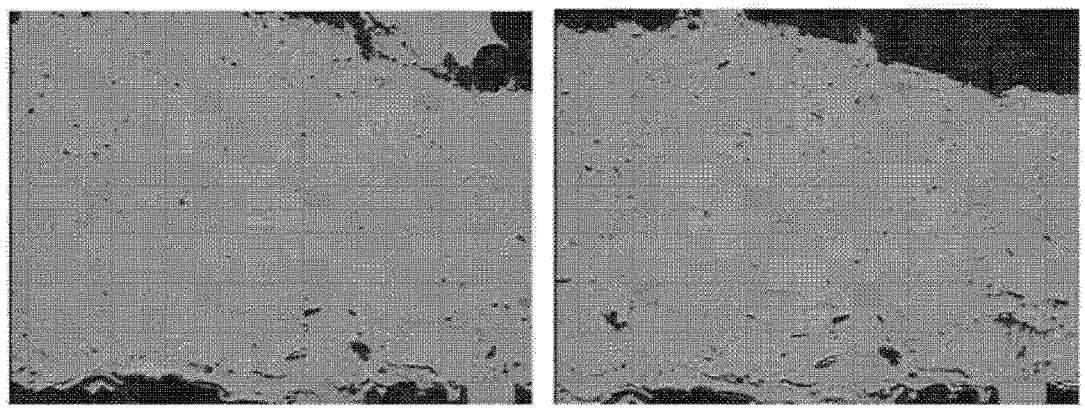
Figure 11:
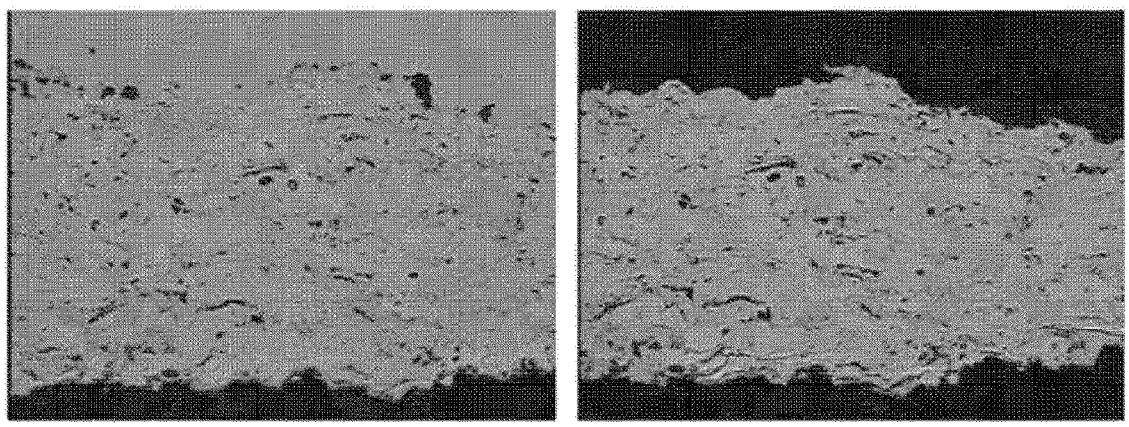

FIGS. 9 to 11 show images of uncorroded/corroded cross-sections of an amorphous alloy layer in a pipe according to the present invention, which are observed with the optical microscope, and FIG. 12 shows images observed with the optical microscope, in which FIGS. 12a and 12b are images of an uncorroded cross-section and a corroded cross-section of a sample of an inner surface of a typical pipe. Samples of inner surfaces of pipes manufactured in Examples 16 to 18 and Comparative Example 15 were immersed in a solution of sulfuric acid ($H_2SO_4$) at a concentration of 95.0 to 98.0 w % for 5 minutes at room temperature for corrosion. Then, the cross-sections of an uncorroded coating sample and a corroded coating sample were observed with an optical microscope (Leica DM4 M) (in FIGS. 9 to 12, the left figure means an uncorroded coating, and the right figure means a corroded coating).

As a result of evaluation, Examples 16 to 18 (see FIGS. 9 to 11) had excellent corrosion resistance, whereas Comparative Example 15 (FIG. 12) had very poor corrosion resistance. This is due to the absence or presence of the amorphous structure of a coating. While in Examples 16 to 18, a coating layer did not react with strongly acidic corrosive, in Comparative Example 15 containing the crystalline structure, a coating layer reacted with the corrosive to corrode and exhibited poor corrosion resistance. In FIG. 12, it was found that while an upper layer of the left figure was white, an upper layer of the right figure was burned black and corroded, and a middle layer of the right figure was changed black after corrosion test. In the case of the Comparative Example 15, it was found that even though the Ni—Cr-based material that is known to be excellent in corrosion resistance in the art, there was a significant difference in the corrosion resistance as compared with Examples 16 to 18 according to the present invention. Meanwhile, a lower layer was a plastic material for fixing a sample, and thus both the left and right figures were black and no change was observed.

Test Example 7

Evaluation of Wear Resistance of Amorphous Alloy Layer in Pipe

In order to evaluate the wear resistance, the samples of the inner surfaces of the pipes manufactured in Examples 16 to 18 and Comparative Example 15 were subjected to a metal ring-lump test under lubricant conditions to obtain wear width values.

In detail, the ring-lump test was performed using MR-H3A high-speed ring-lump wear tester having L-MM 46 resistance friction hydromantic lubricant, under parameters of 50 N, 5 min→100 N, 25 min→1000 N, 55 min. The wear width and friction coefficient can be seen from Tables 4 and 5 below (the friction coefficients of the samples, under the parameters of 100 N, 25 min and 1000 N, 55 min are shown in Table 4 below, and wear width measurement results are shown in Table 5 below).

TABLE 4

| | 100N, 25 min | | 1000N, 55 min | |
|---|---|---|---|---|
| | Friction coefficient ($\mu$) | Average friction coefficient ($\mu$) | Friction coefficient ($\mu$) | Average friction coefficient ($\mu$) |
| Example 16 | 0.001~0.007 | 0.0044 | 0.04~0.078 | 0.0692 |
| Example 17 | 0.005~0.024 | 0.0127 | 0.07~0.095 | 0.0860 |
| Example 18 | 0.02~0.053 | 0.0364 | 0.099~0.117 | 0.1089 |
| Comparative example 15 | — | — | — | — |

TABLE 5

|  | Width/mm |
| --- | --- |
| Example 16 | 0.79 |
| Example 17 | 0.75 |
| Example 18 | 0.71 |
| Comparative example 15 | — |

From the results of Table 4, it was found that on the average, Examples 16 to 18 had a high friction coefficient on average, and Comparative Examples 15 had a relatively low friction coefficient. Furthermore, from the results of Table 5, it was found that Examples 16 to 18 had a relatively narrow width as compared with Comparative Example 15.

Figure 13:
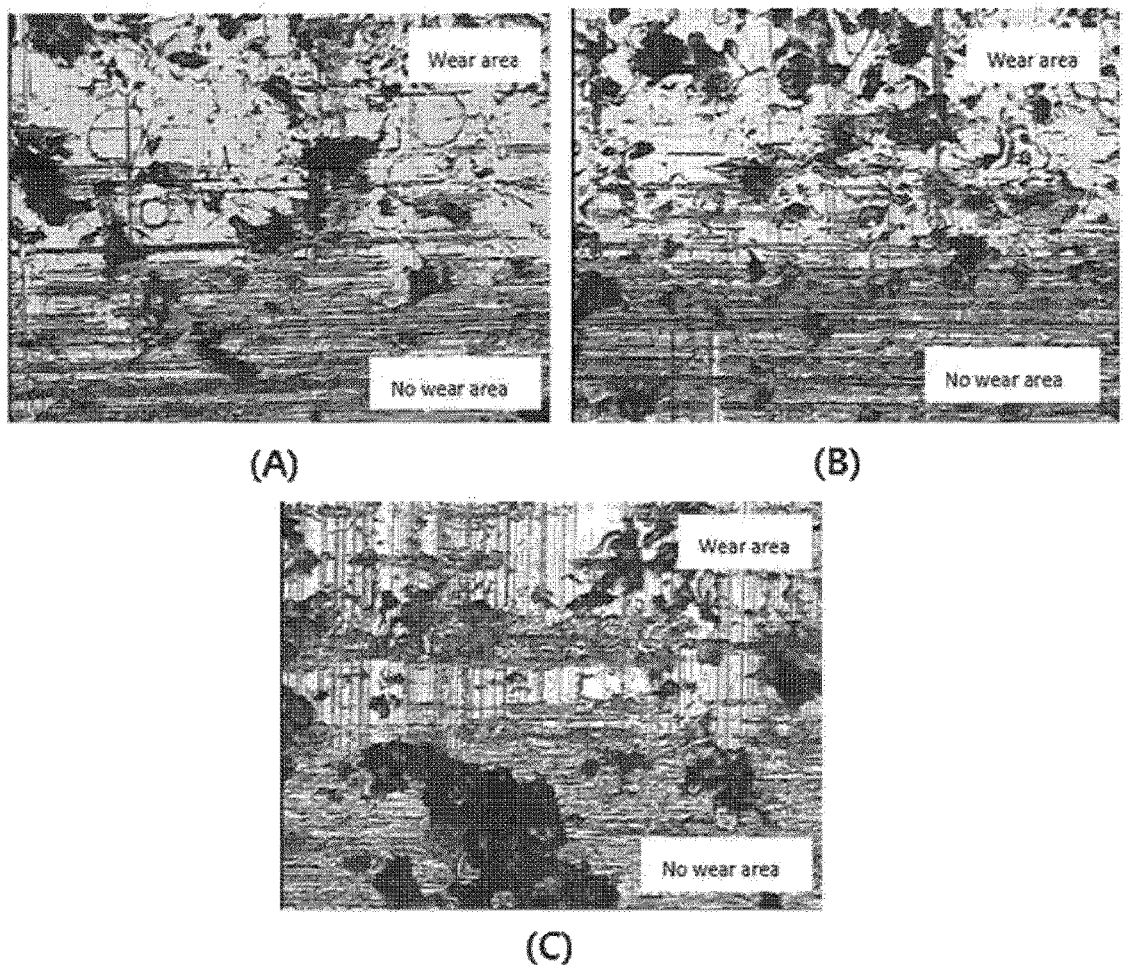
FIG. 13 shows images of degree of wear of the amorphous alloy layer in the pipe according to the present invention, which are observed with the optical microscope.
Figure 14:
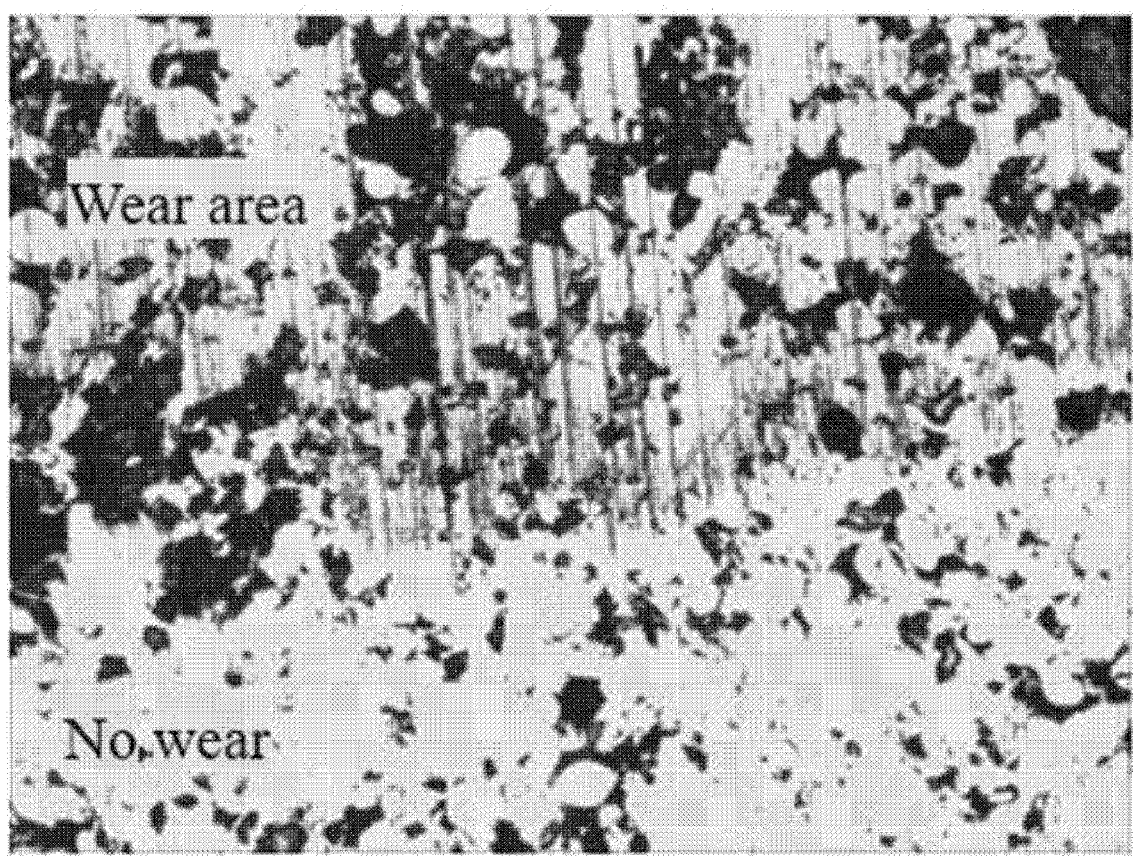
FIG. 14 shows an image of degree of wear of the sample of the inner surface of the typical pipe, which is observed with the optical microscope.

Meanwhile, FIG. 13 shows images of degree of wear of the amorphous alloy layer in the pipe according to the present invention, which are observed with the optical microscope, and FIG. 14 shows an image of degree of wear of the sample of the inner surface of the typical pipe, which is observed with the optical microscope. FIGS. 13a, 13b, 13c, and FIG. 14 show the samples of the inner surfaces of the pipes of Examples 16, 17, 18, and Comparative Example 15, respectively. As shown in FIGS. 13 and 14, Comparative Example 15 had a relatively wide width as compared with the Examples, and the reason why significant wear occurred on the surface of a coating sample was that the coating sample of Comparative Example 15 had a soft wear area.

Although the exemplary embodiments of the present invention have been described for illustrative purposes, those skilled in the art will appreciate that various modifications, additions and substitutions are possible, without departing from the scope and spirit of the invention as disclosed in the accompanying claims.

For example, the composition ratios exemplified in the alloy powders according to the embodiments herein are ratios between the compositions when the compositions are used, and it is not intended to exclude the addition of other metals or other process impurities while maintaining the ratios. Accordingly, it should be understood that the present invention includes various modifications, additions and substitutions without departing from the scope and spirit of the invention as disclosed in the accompanying claims.

What is claimed is:

1. A pipe, comprising:
    a pipe; and
    a coating layer provided on an inner surface of the pipe,
        wherein the coating layer is an alloy or metal layer of a material different from a material of the pipe and contains an amorphous phase in a proportion of equal to or greater than 90%.

2. The pipe of claim 1, wherein the coating layer is a thermal sprayed coating layer formed by a thermal spraying process in which an alloy or metal powder is melted and sprayed.

3. The pipe of claim 2, wherein when a thickness of the pipe is t1 and a thickness of the coating layer is t2, a relationship of $t1*0.05 \leq t2 \leq t1*0.3$ is fulfilled.

4. The pipe of claim 3, wherein the pipe is manufactured by forming a plate on which the coating layer is formed and seaming opposite ends of the plate.

5. The pipe of claim 4, wherein the coating layer provided on the inner surface is made of an Fe-based amorphous alloy.

6. The pipe of claim 5, wherein the Fe-based amorphous alloy has an amorphous structure and contains iron, chromium, and molybdenum as main components.

7. The pipe of claim 6, wherein the Fe-based amorphous alloy is made of an Fe-based amorphous alloy powder containing chromium in an amount of 25.4 to 55.3 parts by weight and molybdenum in an amount of 35.6 to 84.2 parts by weight, per 100 parts by weight of Iron, and further containing at least one selected from the group consisting of carbon and boron.

8. The pipe of claim 5, wherein the coating layer is formed by thermal spraying using the Fe-based amorphous alloy powder.

9. The pipe of claim 8, wherein the thickness of the coating layer is 0.05 to 0.3 mm.

10. The pipe of claim 7, wherein the amorphous phase is contained in the alloy powder in a proportion of 90 to 100% by volume.

11. The pipe of claim 10, wherein when the coating layer is formed by the thermal spraying process using the alloy powder, a proportion of the amorphous phase of the coating layer is 90 to 100% by volume.

12. The pipe of claim 10, wherein a Vickers hardness of the coating layer is 700 to 1,200 Hv (0.2).

13. The pipe of claim 10, wherein a friction coefficient of the coating layer is 0.001 to 0.08μ at a load of 100 N, and 0.06 to 0.12μ at a load of 1,000 N.

14. The pipe of claim 10, wherein the coating layer further contains one selected from the group consisting of tungsten, cobalt, yttrium, manganese, silicon, aluminum, niobium, zirconium, phosphorus, nickel, and a mixture thereof.

15. The pipe of claim 4, wherein a material of the plate is selected from the group consisting of cast iron, carbon steel, stainless steel, maraging steel, aluminum, brass, copper, carbon fiber reinforced plastic, and a mixture thereof.

* * * * *